United States Patent
Huang

(10) Patent No.: US 9,405,354 B2
(45) Date of Patent: Aug. 2, 2016

(54) CONTROLLING METHOD, POWER CONTROLLER, AND POWER CONTROLLING METHOD

(71) Applicant: Leadtrend Technology Corp., Hsin-Chu (TW)

(72) Inventor: Yu-Yun Huang, Hsin-Chu (TW)

(73) Assignee: Leadtrend Technology Corp., Hsinchu County (TW)

( * ) Notice: Subject to any disclaimer, the term of this patent is extended or adjusted under 35 U.S.C. 154(b) by 0 days.

(21) Appl. No.: 14/568,124

(22) Filed: Dec. 12, 2014

(65) Prior Publication Data

US 2015/0100807 A1    Apr. 9, 2015

Related U.S. Application Data

(63) Continuation of application No. 13/236,667, filed on Sep. 20, 2011, now abandoned.

(51) Int. Cl.
*G06F 1/32* (2006.01)
*H02M 3/335* (2006.01)
*H02M 1/32* (2007.01)

(52) U.S. Cl.
CPC .............. *G06F 1/324* (2013.01); *G06F 1/3296* (2013.01); *H02M 3/33507* (2013.01); *H02M 1/32* (2013.01)

(58) Field of Classification Search
CPC .... G06F 1/3296; H02M 1/32; H02M 3/33507
USPC ......... 323/284, 285; 363/21.04, 21.05, 21.07, 363/21.09, 21.1, 21.12, 21.15
See application file for complete search history.

(56) References Cited

U.S. PATENT DOCUMENTS

| | | |
|---|---|---|
| 6,294,904 B1 | 9/2001 | Hirst |
| 7,522,431 B2 | 4/2009 | Huynh |
| 7,643,313 B2 | 1/2010 | Lin |
| 7,782,638 B2 | 8/2010 | Murata |
| 7,906,943 B2 | 3/2011 | Isobe |
| 8,009,445 B2 | 8/2011 | Nakamura |
| 8,085,558 B2 | 12/2011 | Choi |
| 8,089,781 B2 | 1/2012 | Djenguerian |
| 8,102,679 B2 | 1/2012 | Gong |
| 8,289,732 B2 | 10/2012 | Li |
| 8,391,028 B2 | 3/2013 | Yeh |
| 2004/0136208 A1* | 7/2004 | Agarwal ............. H02M 1/4208 363/21.12 |

(Continued)

FOREIGN PATENT DOCUMENTS

| | | |
|---|---|---|
| TW | I269508 | 12/2006 |
| TW | I277854 | 4/2007 |

(Continued)

*Primary Examiner* — Gary L Laxton
*Assistant Examiner* — Kyle J Moody
(74) *Attorney, Agent, or Firm* — Winston Hsu; Scott Margo

(57) ABSTRACT

A power supply has an inductor and determines loading state of the power supply according to a compensation signal. When the loading state is determined to be a light loading state or a no-loading state, a switch is operated at a low operating frequency. When the loading state is determined to be a heavy loading state, the switch is operated at a high operating frequency. If the compensation signal exceeds a critical value, it is determined that the loading state is an overloaded state. When the overloaded state continues past a tolerable duration, the switch is turned off. The tolerable duration is determined by an external capacitor and is independent of the operating frequency.

12 Claims, 4 Drawing Sheets

(56) References Cited

U.S. PATENT DOCUMENTS

| | | |
|---|---|---|
| 2005/0258812 A1 | 11/2005 | Halberstadt |
| 2008/0025054 A1 | 1/2008 | Yang |
| 2009/0201705 A1 | 8/2009 | Murata |
| 2009/0206814 A1 | 8/2009 | Zhang |
| 2011/0103101 A1 | 5/2011 | Hiasa |
| 2011/0182089 A1 | 7/2011 | genannt Berghegger |
| 2011/0228566 A1* | 9/2011 | Liang .................. H02M 1/32 363/21.02 |
| 2013/0033902 A1 | 2/2013 | Zhang |
| 2013/0033905 A1 | 2/2013 | Lin |
| 2013/0058138 A1 | 3/2013 | Djenguerian |
| 2013/0343096 A1* | 12/2013 | Stuler .................. H02M 1/32 363/21.02 |

FOREIGN PATENT DOCUMENTS

| | | |
|---|---|---|
| TW | 200826438 | 6/2008 |
| TW | I306187 | 2/2009 |

* cited by examiner

CONTROLLING METHOD, POWER CONTROLLER, AND POWER CONTROLLING METHOD

CROSS REFERENCE TO RELATED APPLICATIONS

This is a continuation application of U.S. patent application Ser. No. 13/236,667, filed on Sep. 20, 2011, and all benefits of such earlier application are hereby claimed for this new continuation application.

BACKGROUND OF THE INVENTION

1. Field of the Invention

The present invention is related to an overloading limitation of a switched-mode power supply (SMPS).

2. Description of the Prior Art

A power supply is a kind of power management device that transforms power from a power source to provide transformed power to an electronic device or component. FIG. 1 illustrates conventional power supply 60, which employs a flyback topology. In FIG. 1, bridge rectifier 62 is utilized for rectifying AC power $V_{AC}$ to provide input power $V_{IN}$ to transformer 64. When switch 72 is close-circuited, primary winding $L_p$ of transformer 64 is charged. When switch 72 is open-circuited, secondary winding $L_s$ of transformer 64 discharges to load capacitor 69 via rectifier 66 to generate output power $V_{OUT}$. Error amplifier EA compares voltage levels of output power $V_{OUT}$ and target voltage $V_{TARGET}$ to generate a compensation signal $V_{com}$. Controller 74 controls switch 72 with the aid of control signal $V_{GATE}$ according to both compensation signal $V_{com}$ and current detection signal $V_{cs}$, which correspond to inductive current flowing through primary winding $L_p$.

Many types of protection may be added to power supply 60, including over-voltage protection (OVP), over-temperature protection (OTP), and overload protection (OLP). Overload protection is used when output current loading of power supply 60 is too high, and when the power supply provides power exceeding a predetermined output power level.

Overload protection may be implemented by limiting output current, or by limiting the inductive current flowing through primary winding L. Both implementations are intended to prevent power outputted by the power supply from exceeding a certain level.

SUMMARY OF THE INVENTION

An embodiment provides a controlling method utilized in a power supply comprising a switch and an inductive element. The controlling method includes detecting an inductive current flowing through the inductive element; determining the power supply under a normal loading state or an overloaded state according to a feedback signal; controlling a peak of the inductive current to be smaller than or equal to a constant magnitude and controlling the switch to be operated in a first frequency when the power supply is operated under the normal loading state; controlling the peak of the inductive current to be approximately the constant magnitude and controlling the switch to be operated in a second frequency when the power supply is operated under the overloaded state, wherein the second frequency is higher than the first frequency; calculating a duration during which the power supply is operated under the overloaded state; and stopping the inductive current when the duration exceeds a tolerable duration; wherein the tolerable duration is independent of variation of the operating frequency.

Another embodiment provides a power supply. The power supply includes a controller. The controller is used for controlling an inductive current flowing through an inductive element. The controller includes a clock generator, a current limiter, and an overloading limiter. The clock generator is used for generating an operating frequency. The current limiter is used for controlling a peak of the inductive current to be approximately a constant magnitude, wherein when the current limiter controls the peak to be approximately the constant magnitude, the operating frequency is lower than or equal to a first frequency. The overloading limiter includes an overloading identifier and a current supply. The overloading identifier is used for identifying whether the power supply should enter an overloaded state according to a feedback signal, wherein when the power supply is operated in the overloaded state, the operating frequency is a second frequency higher than the first frequency. The current supply is used for providing a charging/discharging current to an external capacitor and for calculating a duration during which the power supply is operated in the overloaded state. When the duration exceeds a tolerable duration, the controller stops the inductive current, and the tolerable duration is independent from variation of the operating frequency.

Another embodiment provides a power controller utilized for a power supply including an inductive element and a switch. The power controller includes a first comparator, a clock generator, and an overloading limiter. The first comparator is used for receiving a compensation signal and a current detection signal to control the switch, wherein the current detection signal corresponds to an inductive current flowing through the inductive element, the compensation signal corresponds to a loading state of the power supply, and the first comparator is utilized for approximately determining a peak of the inductive current according to the compensation signal. The clock generator is used for roughly providing an operating frequency of the switch according to the compensation signal, wherein the operating frequency is a high operating frequency when the loading state is a heavy loading state and the operating frequency is a low operating frequency when the loading state is a light loading state or a no-loading state. The overloading limiter including a charge/discharge device coupled to an external capacitor for detecting the compensation signal to determine whether an overload event occurs, and for outputting an overload limiting signal to turn off the switch when a tolerable duration is exceeded after the overload event occurs. The external capacitor and the charge/discharge device forming a clock oscillator, and the tolerable duration is determined by the external capacitor and independent of the clock oscillator.

Another embodiment provides a power controlling method utilized for a power supply, the power supply including an inductive element and a switch. The power controlling method includes determining a loading state of the power supply according to a compensation signal, controlling the switch to be operated under a high operating frequency when the loading state is a heavy loading state, and controlling the switch to be operated under a low operating frequency when the loading state is a light loading state or a no-loading state; and determining the loading state to be an overloaded state when the compensation signal exceeds a critical value, and turning off the switch when the overloaded state lasts beyond a tolerable duration; wherein the tolerable duration is determined according to an external capacitor and is independent of both the high and low operating frequencies for operating the switch.

Another embodiment provides a power controlling method utilized for a power supply, the power supply including an inductive element and being controlled by a switch to charge or discharge for generating an output power. The power controlling method includes providing a clock generator for roughly providing an operating frequency of the switch; detecting a loading state of the power supply; adjusting the operating frequency according to the loading state, wherein the operating frequency is a first frequency when the loading state is a heavy loading state; controlling the operating frequency to approximately be a second frequency higher than the first frequency within a tolerable duration when the loading state is an overloaded state; and ceasing operations of the switch after the tolerable duration is exceeded; wherein the tolerable duration is independent of a clock oscillator.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
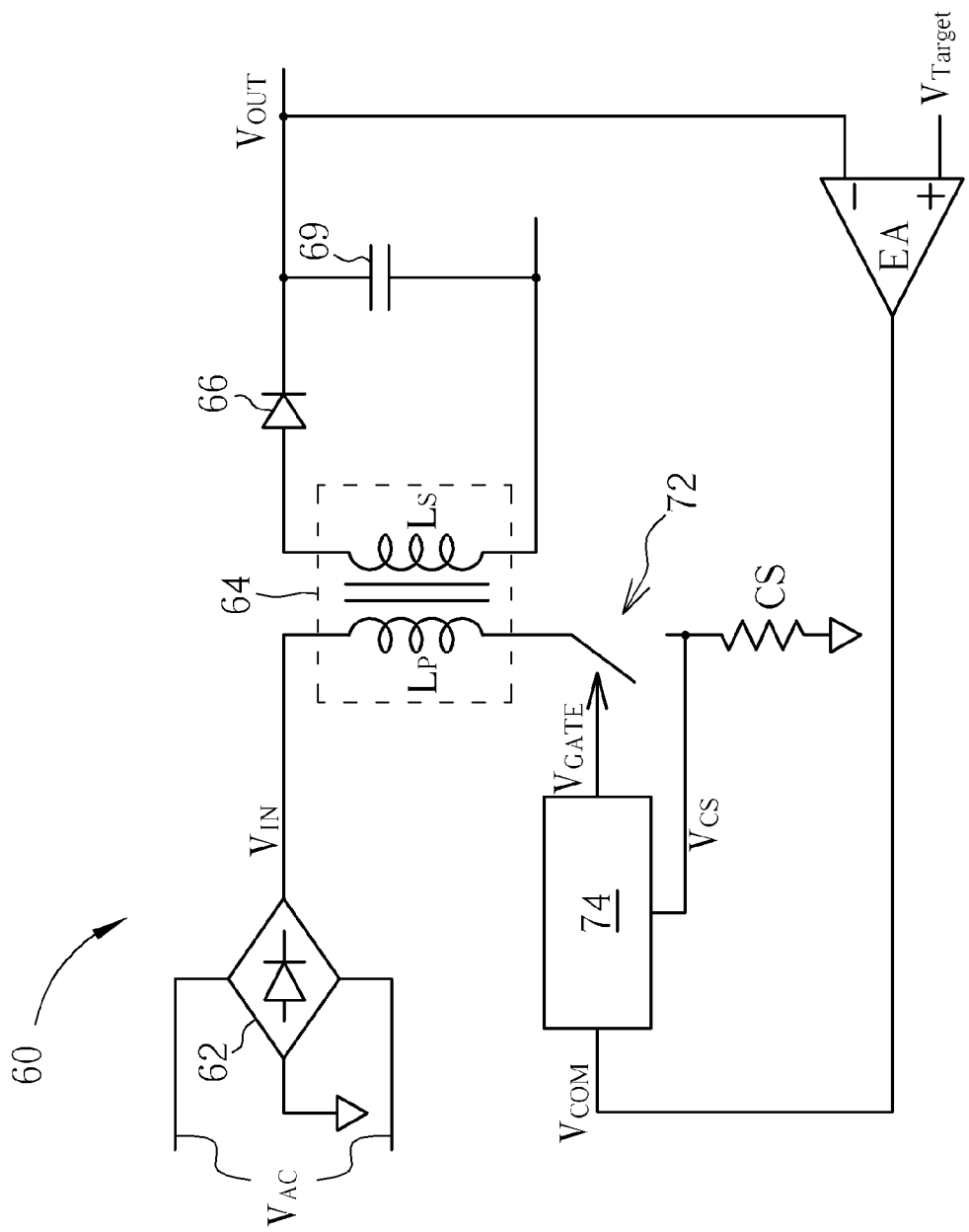
FIG. 1 illustrates a conventional power supply acquiring a flyback topology.
Figure 2:
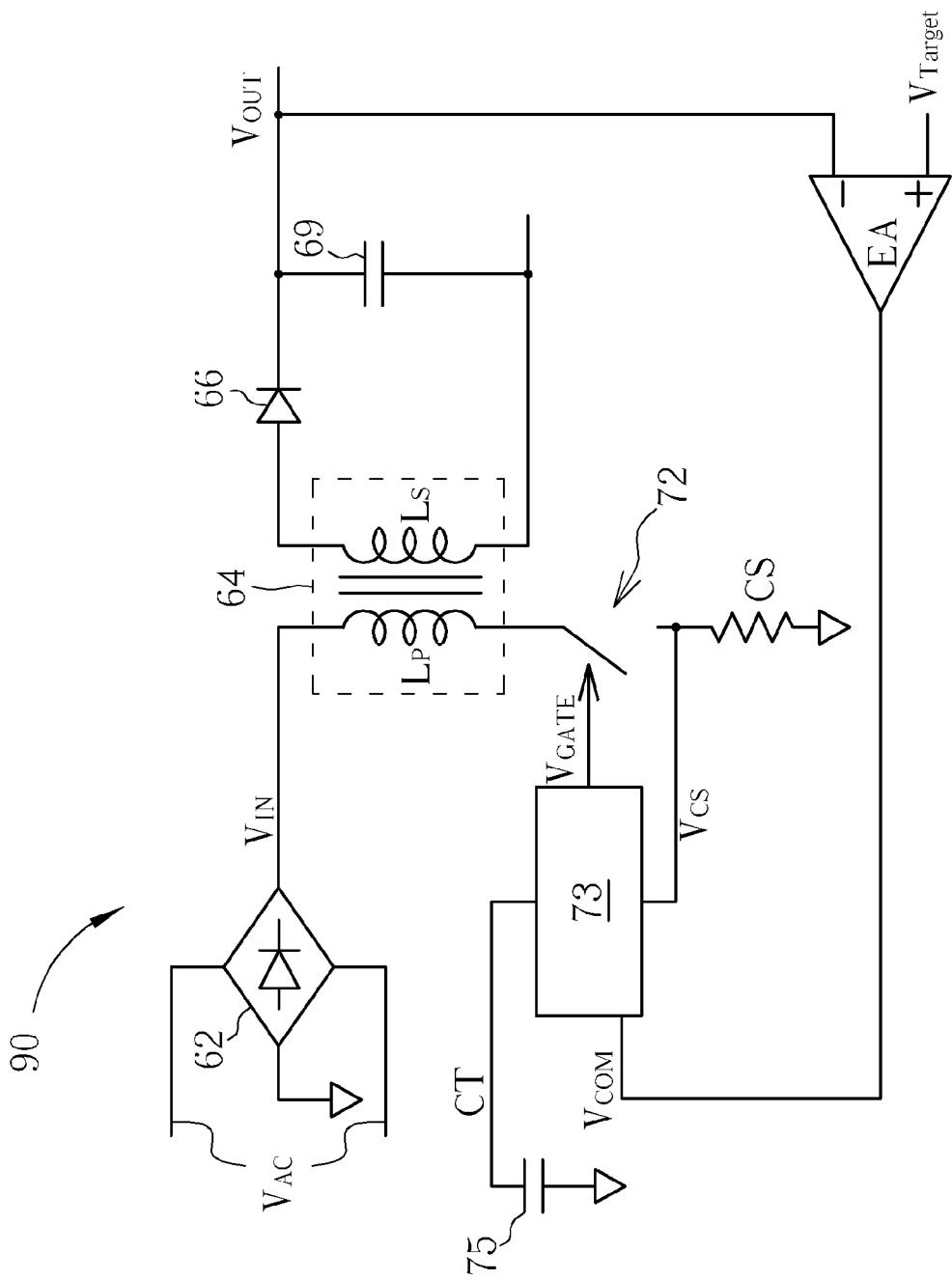
FIG. 2 illustrates a power supply according to an embodiment of the present invention.

Please refer to FIG. 2, which illustrates power supply 90 according to an embodiment of the present invention. Similar reference numerals are used in FIG. 1 and FIG. 2 to indicate same elements, same devices, or same signals, and are not described repeatedly for brevity. Embodiments generated by using elements the same as or similar to elements shown in FIG. 1 should be regarded as embodiments of the present invention. Scope of the present invention should also follow claims of the present invention.

In an embodiment, controller 73 shown in FIG. 2 is implemented by a single integrated circuit. In another embodiment, controller 73 and switch 72 are implemented in a single integrated circuit. A difference between controllers 73 and 74 lies in addition of pin CT of controller 73 shown in FIG. 2, where controller 73 is coupled to external capacitor 75 via pin CT.

Figure 3:
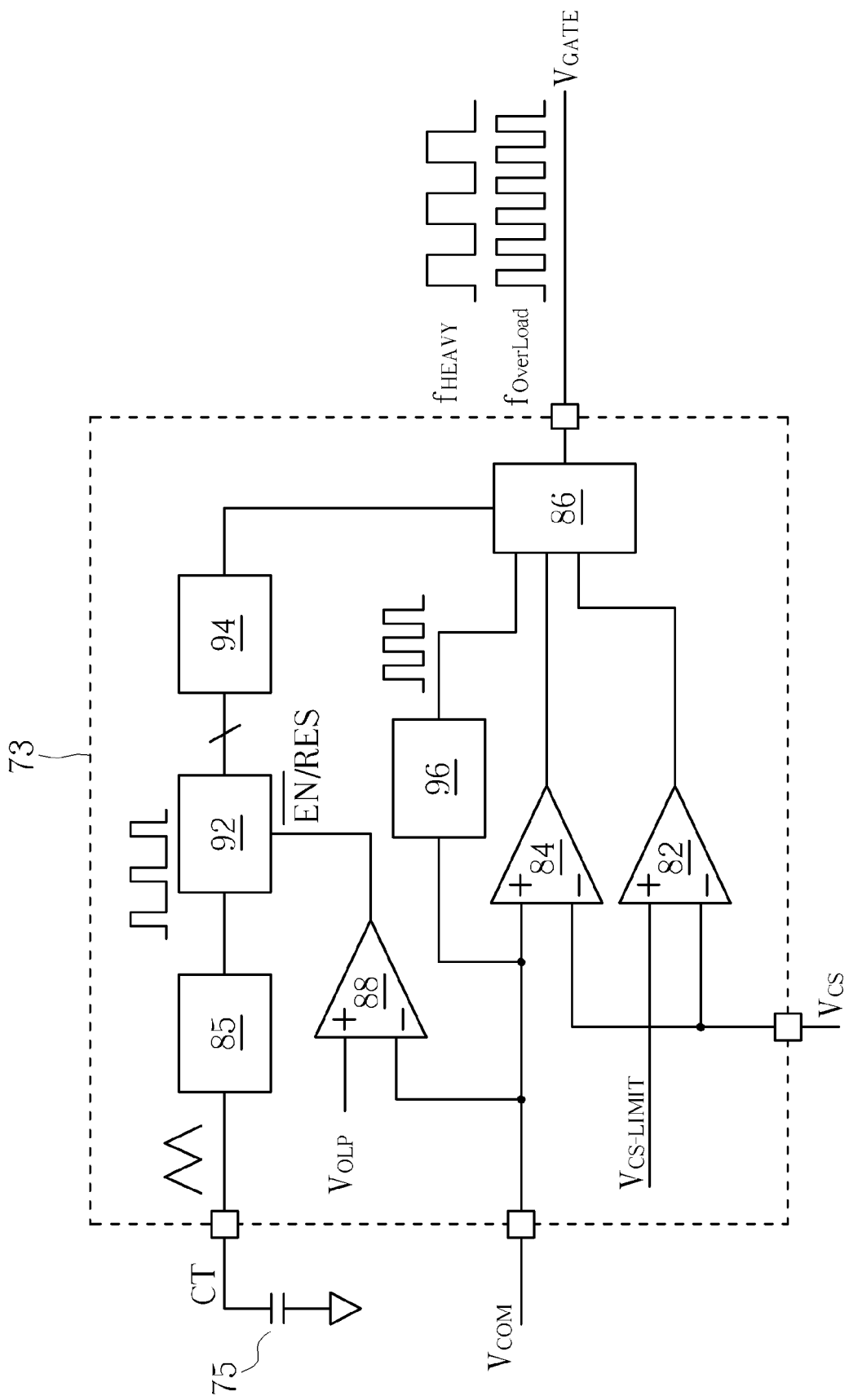
FIG. 3 illustrates part of the controller and the external capacitor shown in FIG. 2.

FIG. 3 illustrates part of controller 73 and external capacitor shown in FIG. 2. Comparator 82 is utilized for providing over-current protection, and is a peak limiter for preventing any peak of current detection signal $V_{cs}$ from exceeding voltage $V_{CS\text{-}LIMIT}$. A peak of the inductive current flowing through the primary winding $L_p$ is also prevented from exceeding peak current $I_{CS\_LIMIT}$ ($V_{CS\text{-}LIMIT}/R_{CS}$), where $R_{CS}$ indicates resistance of resistor CS. Comparator 84 controls an approximate peak of the inductive current flowing through primary winding $L_p$ according to compensation signal $V_{COM}$. Voltage level of compensation signal $V_{COM}$ corresponds to power required for sustaining a current output voltage or a loading state related to the current output voltage. Compensation signal $V_{COM}$ also determines output operating frequency of clock generator 96, i.e. operating frequency of switch 72 shown in FIG. 2. For example, a low voltage level of compensation signal $V_{COM}$ indicates a light loading state or a no-loading state, so that a corresponding operating frequency may be equal to 20 kHz. A high voltage level of compensation signal $V_{com}$ indicates a heavy loading state, so that a corresponding operating frequency may be equal to 65 kHz. The heavy loading state, the light loading state, and the no-loading state are all regarded as normal loading states.

Current supplier 85 provides a charge/discharge current to external capacitor 75 via pin CT. A combination of current supplier 85 and external capacitor 75 may be regarded as a clock oscillator, i.e. forming a clock oscillator. When the compensation signal $V_{COM}$ is higher than critical voltage $V_{OLP}$ for overload protection, i.e. when an overload event occurs, power supply 90 is determined to begin operating in an overloaded state, and comparator 88 starts counter 92 counting according to a clock signal outputted by the clock oscillator. Once comparator 94 determines that the output of counter 92 fulfills a predetermined condition, indicating the overload event has continued past a tolerable duration, comparator 94 begins outputting an overload limiting signal for triggering overload protection, and logic control unit 86 keeps switch 72 turned off to stop power transformation and power transmission. If the compensation signal $V_{COM}$ drops below the critical voltage $V_{OLP}$ before the tolerable duration is exceeded, i.e. when power supply 90 leaves the overloaded state, counter 92 is reset, and switch 72 continues to be operated at the operating frequency provided by clock generator 96. A combination of current provider 85, comparator 88, counter 92, and comparator 94 may be regarded as an overload limiter. In another embodiment of the present invention, comparator 94 is omitted, and whether to trigger overload protection or not is determined directly according to an output bit having value of logical 0 or logical 1.

It can be seen from the illustration of controller 73 shown in FIG. 3 that the tolerable duration indicates a maximum duration tolerable for power supply 90 to be in the overloaded state, where the tolerable duration is determined according to both the frequency provided by the clock oscillator, which includes at least current provider 85 and external capacitor 75, and a predetermined condition defined by comparator 94. The tolerable duration is independent of variation of the operating frequency generated by clock generator 96. For example, in design, comparator 94 is built in an integrated circuit so that external factors cannot change settings of comparator 94, and the frequency of the clock oscillator can be determined according to capacitance of external capacitor 75. Therefore, the tolerable duration can be easily adjusted by selecting an appropriate capacitance for external capacitor 75.

In one embodiment of the present invention, after overload protection is triggered, overload protection is de-asserted once compensation signal $V_{COM}$ drops below critical voltage VOLP, so that power transformation and power transmission are restored. In another embodiment of the present invention, overload protection is de-asserted only when the AC power source of controller 73 is removed and restarted.

Figure 4:
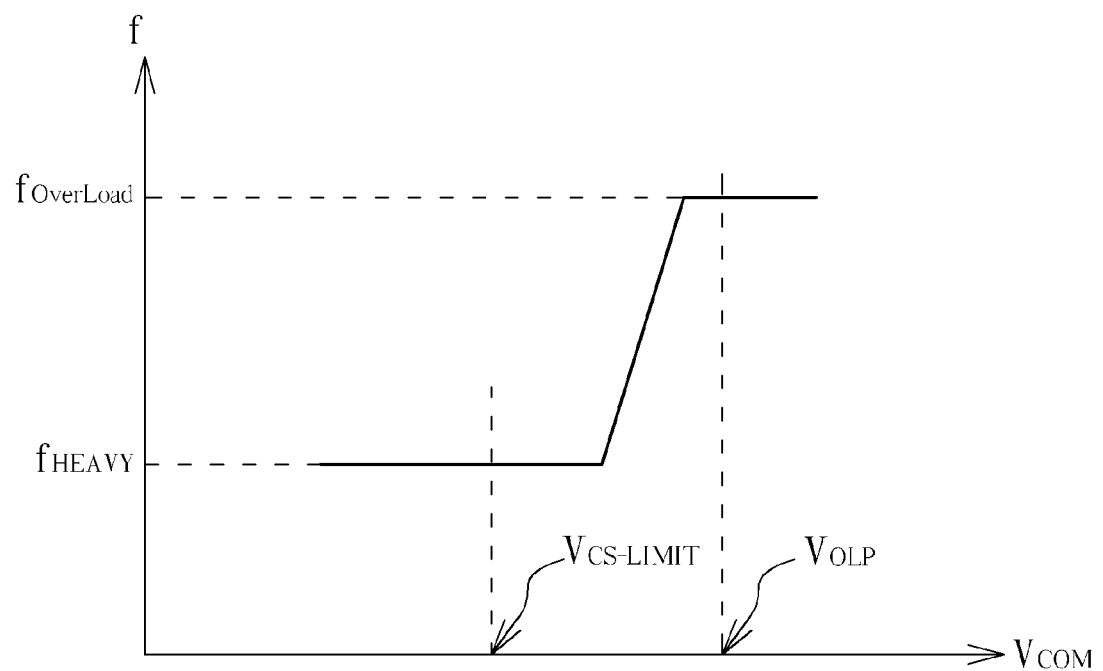
FIG. 4 illustrates a correspondence between the operating frequency generated by the clock generator and the compensation signal.

FIG. 4 illustrates a correspondence between the operating frequency generated by clock generator 96 and the compensation signal $V_{COM}$. When the voltage level of compensation signal $V_{COM}$ reaches voltage $V_{CS\text{-}LIMIT}$, i.e. when heavy loading occurs, the operating frequency is adjusted to be heavy-loading frequency $f_{HEAVY}$, which may be 65 kHz in one embodiment of the present invention. When the voltage level of compensation signal $V_{COM}$ reaches critical voltage $V_{OLP}$ for overload protection, i.e. when the overloaded state is triggered, the operating frequency is adjusted to be overloaded frequency $f_{OverLoad}$, which may be 130 kHz in one embodiment of the present invention. When the peak of the inductive current flowing through primary winding $L_p$ is roughly equal to $I_{CS\_LIMIT}$, the operating frequency is at least heavy-loading frequency $f_{HEAVY}$. During the tolerable duration, i.e. when compensation signal $V_{COM}$ is higher than critical voltage $V_{OLP}$ for overload protection, the peak of the inductive current is approximately controlled to be fixed to $I_{CS\_LIMIT}$, because of the restriction provided by comparator 82. However, the operating frequency is equal to overloaded frequency $f_{OverLoad}$, instead of heavy-loading frequency $f_{HEAVY}$, where overloaded frequency $f_{OverLoad}$ is higher than heavy-loading frequency $f_{HEAVY}$. For example, overloaded frequency $f_{OverLoad}$ can be double or triple heavy-loading frequency $f_{HEAVY}$.

The above-mentioned embodiments of the present invention provide two advantages. First, transformer 64 is prevented from saturating. The current $I_{CS\_LIMIT}$ can be set to a maximum current before the transformer 64 saturates. Therefore, as long as transformer 64 does not saturate, the output power of power supply 90 can be temporarily raised merely by raising the operating frequency of controller 73 to the overloaded frequency $f_{OverLoad}$. Second, the tolerable duration can be adjusted externally. As mentioned before, the tolerable duration is independent of the operating frequency, and is determined by the clock oscillator formed by both current supply 85 and external capacitor 75. Therefore, the tolerable duration can be determined easily by appropriately choosing the capacitance of external capacitor 75. However, if the tolerable duration is a few seconds, the clock oscillator will introduce large integrated circuit area if completely formed by integrated circuits. Thus, use of external capacitor 75 to adjust the tolerable duration saves significant circuit layout area.

The switched-mode power supply is described for flyback topology, but the embodiments of the present invention can also be utilized in down-converting and up-converting switched-mode power supplies.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A controlling method utilized in a power supply comprising a switch and an inductive element, the controlling method comprising:
   detecting an inductive current flowing through the inductive element;
   determining the power supply is operated under a normal loading state or an overloaded state according to a feedback signal;
   controlling a peak of the inductive current to be smaller than or equal to a constant magnitude;
   controlling the switch to be operated in a first fixed frequency when the power supply is under the normal loading state and operated in a second fixed frequency when the power supply is under the overloaded state, wherein the second fixed frequency is higher than the first fixed frequency;
   calculating a duration during which the power supply is operated under the overloaded state; and
   ceasing the operation of the switch when the duration exceeds a tolerable duration;
   wherein the tolerable duration is independent of variation of an operating frequency of the switch, and the operating frequency of the switch increases according to the feedback signal from the first fixed frequency to the second fixed frequency.

2. The controlling method of claim 1 further comprising:
   adapting the operating frequency according to the feedback signal.

3. The controlling method of claim 1, wherein the second fixed frequency is double to the first fixed frequency.

4. The controlling method of claim 1 further comprising:
   providing a clock generator to generate the operating frequency;
   wherein the tolerable duration is independent of the operating frequency.

5. The controlling method of claim 1 further comprising:
   controlling the operating frequency to approximately be a third frequency lower than the first fixed frequency when the loading state is a light loading state or a no-loading state.

6. A power controller utilized for a power supply comprising an inductive element and a switch, the power controller comprising:
   a first comparator, for receiving a feedback signal and a current detection signal to control the switch, wherein the current detection signal corresponds to an inductive current flowing through the inductive element, the feedback signal corresponds to a loading state of the power supply, and the first comparator is utilized for determining a peak of the inductive current according to the feedback signal;
   a clock generator, for providing an operating frequency of the switch according to the feedback signal, wherein the operating frequency is a first fixed frequency when the loading state is a heavy loading state, the operating frequency is a low operating frequency when the loading state is a light loading state or a no-loading state;
   an overloading detector, for detecting the feedback signal to determine whether an overload event occurs, and for outputting an overload limiting signal to turn off the switch when a tolerable duration is exceeded after the overload event occurs; and
   wherein a clock oscillator determines the operating frequency to be a second fixed frequency higher than the first fixed frequency within the tolerable duration after an occurrence of the overload event, and the operating frequency of the switch increases according to the feedback signal when the operating frequency of the switch changes from the first fixed frequency to the second fixed frequency.

7. The power controller of claim 6 wherein the overloading detector further comprises:
   a second comparator, for comparing the feedback signal with a critical signal and outputting an overload signal indicating the overload event occurred if the feedback signal is higher than the critical signal; and
   a counter coupled to the second comparator, for receiving a clock signal and starting to count when the second comparator outputs the overload signal.

8. The power controller of claim 6 further comprising:
   a peak limiter, for detecting the current detection signal and outputting a peak limiting signal to control the switch, and thereby approximately limiting the peak of the inductive current to be a limit peak.

9. The power controller of claim 8, wherein the peak of the inductive current is the limit peak within the tolerable duration after an occurrence of the overload event.

10. A power controlling method utilized for a power supply, the power supply comprising an inductive element and being controlled by a switch to charge or discharge for generating an output power, the power controlling method comprising:
- providing a clock generator for determining an operating frequency of the switch;
- detecting a loading state of the power supply according to a feedback signal;
- adjusting the operating frequency according to the loading state, wherein the operating frequency is a first fixed frequency when the loading state is a heavy loading state;
- controlling the operating frequency to be a second fixed frequency higher than the first fixed frequency within a tolerable duration when the loading state is an overloaded state; and
- ceasing the operation of the switch after the tolerable duration is exceeded;
- wherein the operating frequency of the switch increases according to the feedback signal over a period when the operating frequency of the switch changes from the first fixed frequency to the second fixed frequency.

11. The power controlling method of claim 10, wherein the method for detecting the loading state of the power supply comprises:
- comparing a compensation signal with a critical signal, and determining the loading state to be the overloaded state when the compensation signal is higher than the critical signal.

12. The power controlling method of claim 10 further comprising:
- controlling the operating frequency to approximately be a third frequency lower than the first fixed frequency within a tolerable duration when the loading state is a light loading state or a no-loading state.

\* \* \* \* \*